United States Patent
McDowell

(10) Patent No.: US 6,260,125 B1
(45) Date of Patent: Jul. 10, 2001

(54) ASYNCHRONOUS WRITE QUEUES, RECONSTRUCTION AND CHECK-POINTING IN DISK-MIRRORING APPLICATIONS

(75) Inventor: Steven R. McDowell, Lexington, SC (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/207,935

(22) Filed: Dec. 9, 1998

(51) Int. Cl.[7] .................................................. G06F 12/00
(52) U.S. Cl. .................................................. 711/162
(58) Field of Search ........................... 711/111, 112, 114, 711/161, 162, 152; 714/6; 707/10, 204

(56) References Cited

U.S. PATENT DOCUMENTS

| | | | |
|---|---|---|---|
| 5,513,314 | * 4/1996 | Kandasamy et al. | 395/182.04 |
| 5,537,533 | * 7/1996 | Staheli et al. | 395/182.03 |
| 5,555,371 | * 9/1996 | Duyanovich et al. | 395/182.11 |
| 5,701,516 | * 12/1997 | Cheng et al. | 395/842 |
| 5,737,514 | * 4/1998 | Stiffler | 395/182.11 |
| 5,742,792 | * 4/1998 | Yanai et al. | 395/489 |
| 5,764,903 | * 6/1998 | Yu | 395/200.38 |
| 5,958,070 | * 9/1999 | Stiffler | 714/13 |
| 6,006,307 | * 12/1999 | Cherukuri | 711/114 |

* cited by examiner

Primary Examiner—Kevin Verbrugge
(74) Attorney, Agent, or Firm—James M. Stover

(57) ABSTRACT

An asynchronous disk mirroring system for use within a network computer system. The disk mirroring system includes a first storage volume connected to receive write requests from the computer system; a write queue connected to also receive the write requests directed to the first storage volume; and a second storage volume connected to the write queue to receive the write requests. The write queue operates to delay the time of receipt of the write requests by the second storage volume. Write requests are passed through the write queue, comprising a plurality of serially connected write buffers, in a first-in, first-out (FIFO) order. A log file connected to receive the delayed write requests from the write queue is also included in the disk mirroring system to provide for log-based mirror reconstruction and check-pointing of the mirrored volumes.

7 Claims, 4 Drawing Sheets

ASYNCHRONOUS WRITE QUEUES, RECONSTRUCTION AND CHECK-POINTING IN DISK-MIRRORING APPLICATIONS

The present invention relates to clustered computer systems and, more particularly, to methods for mirroring disk drives within a network.

BACKGROUND OF THE INVENTION

The increased reliance by business on On-Line Transaction Processing and Decision Support Systems has increased the demand for high availability systems since these systems are critical to the functioning of day-to-day activities in many businesses. These systems are not only essential for the support of normal daily operations, but they also store critically important customer and corporate data. Continuous availability is no longer an ideal; it is a necessity for many companies. Longer work days, expansion into new markets and customer demand for more efficient service create an expanded requirement for increased system availability. Users are demanding a means of ensuring very high availability of their applications and the access to data that permits them to accomplish their tasks and provide the highest levels of customer service. Interruption of workflow due to system failure is expensive and it can cause the loss of business. The need to increase computer system availability is becoming one of businesses key concerns.

Implementation of client/server computing is growing throughout today's businesses—for key business applications as well as electronic mail, distributed databases, file transfer, retail point-of-sale, inter-networking, and other applications. It is possible for companies to gain competitive advantages from client/server environments by controlling the cost of the technology components through economies of scale and the use of clustered computing resources. There is a boost in productivity when businesses have high availability and easy access to information throughout the corporate enterprise.

Computer system availability and reliability are improved when multiple servers are utilized together with a "fail-over" scheme such as provided by NCR Corporation's LifeKeeper product. In such a system, should one server fail the functions and applications associated with the failed server are transferred to one or more of the remaining operational or standby servers.

An important component of a high-availability client/server system is a reliable, fault-tolerant data storage system. In some networked or "clustered" multiple server arrangements, the physical data storage system may be a shared RAID (Redundant Array of Inexpensive Disks) disk array system, or a shared pair of disk drives or disk arrays operating in a mirrored arrangement.

A computer system including multiple servers and a pair of shared disk drives is shown in FIG. 1. FIG. 1 provides a diagram of clustered or networked computers having a primary server 101 and a secondary server 103 in a fail-over pair arrangement. Primary server 101 is the preferred application server of the pair, and secondary server 103 preferably provides fail-over protection for the primary server. The primary and secondary servers are coupled through a network bus system 105 to a plurality of client computers 107 though 109. The primary and secondary servers 101 and 103 each shares access to a pair of disk storage devices 111 and 113. Disk storage devices 111 and 113 are SCSI (Small Computer Systems Interface) disk drives or disk arrays connected to servers 101 and 103 through a pair of SCSI busses 115 and 117.

Disk storage devices 111 and 113 are two equal-capacity storage devices that mirror each other. Each storage device contains a duplicate of all files contained on the other storage device, and a write or update to one storage device updates both devices in the same manner. In the event that either storage device fails, the data contained therein remains available to the system from the operational mirror storage device.

In other client/server arrangements, the physical storage devices for the primary and secondary servers may be separate, non-shared, physical storage devices. A network based file system volume replication scheme where the contents of the file system stored on a primary physical storage media are also copied to a secondary physical storage media is commercially available from NCR Corporation, assignee of the present application, under the product name "Extended Mirroring".

Most disk mirroring procedures utilizing shared drives will write or update both mirror drives synchronously. In systems performing disk mirroring with non-shared drives over a network, writes directed to a primary drive are received and forwarded to the secondary mirror drive. Upon receipt from the secondary drive of an acknowledgement signal indicating a successful update of the secondary drive, the write to the primary is completed. Although the updates to the primary and secondary drives do not occur simultaneously, this process will also be referred to as a synchronous write in the following discussion.

Disk mirroring applications that provide synchronous writes are inherently limited in what they can do. Being synchronous, each writer blocks until the write is complete. This limits performance and flexibility.

OBJECTS OF THE INVENTION

It is therefore an object of the present invention to provide a new and method and mechanism for mirroring storage devices over a network.

It is another object of the present invention to provide such a method for performing asynchronous updates to mirrored drives.

It is yet another object of the present invention to provide a new and useful method and mechanism for performing asynchronous updates to mirrored drives through implementation of an asynchronous write queue.

It is still a further object of the present invention to provide a new and useful method and mechanism for performing log-based reconstruction of a mirror drive in a network disk mirroring application.

It is also an object of the present invention to provide a new and useful ability to "check point" source and target volumes within a disk mirroring application.

SUMMARY OF THE INVENTION

There is provided, in accordance with the present invention, an asynchronous disk mirroring system for use within a network computer system. The disk mirroring system includes a first storage volume connected to receive write requests from the computer system; a write queue connected to also receive the write requests directed to the first storage volume; and a second storage volume connected to the write queue to receive the write requests. The write queue operates to delay the time of receipt of the write requests by the second storage volume.

In the described embodiment of the invention, the write queue comprises a plurality of serially connected write buffers, wherein the write requests pass through the write queue in a first-in, first-out (FIFO) sequence. Additionally, a mechanism is provided to stop the transmission of additional write requests to the first storage volume and the write queue when the plurality of serially connected write buffers are full. A log file connected to receive the delayed write requests from the write queue is also included within the disk mirroring system to provide for log-based mirror reconstruction and check-pointing of the mirrored volumes.

The above and other objects, features, and advantages of the present invention will become apparent from the following description and the attached drawings.

DETAILED DESCRIPTION OF THE PREFERRED EMBODIMENT

Figure 1:
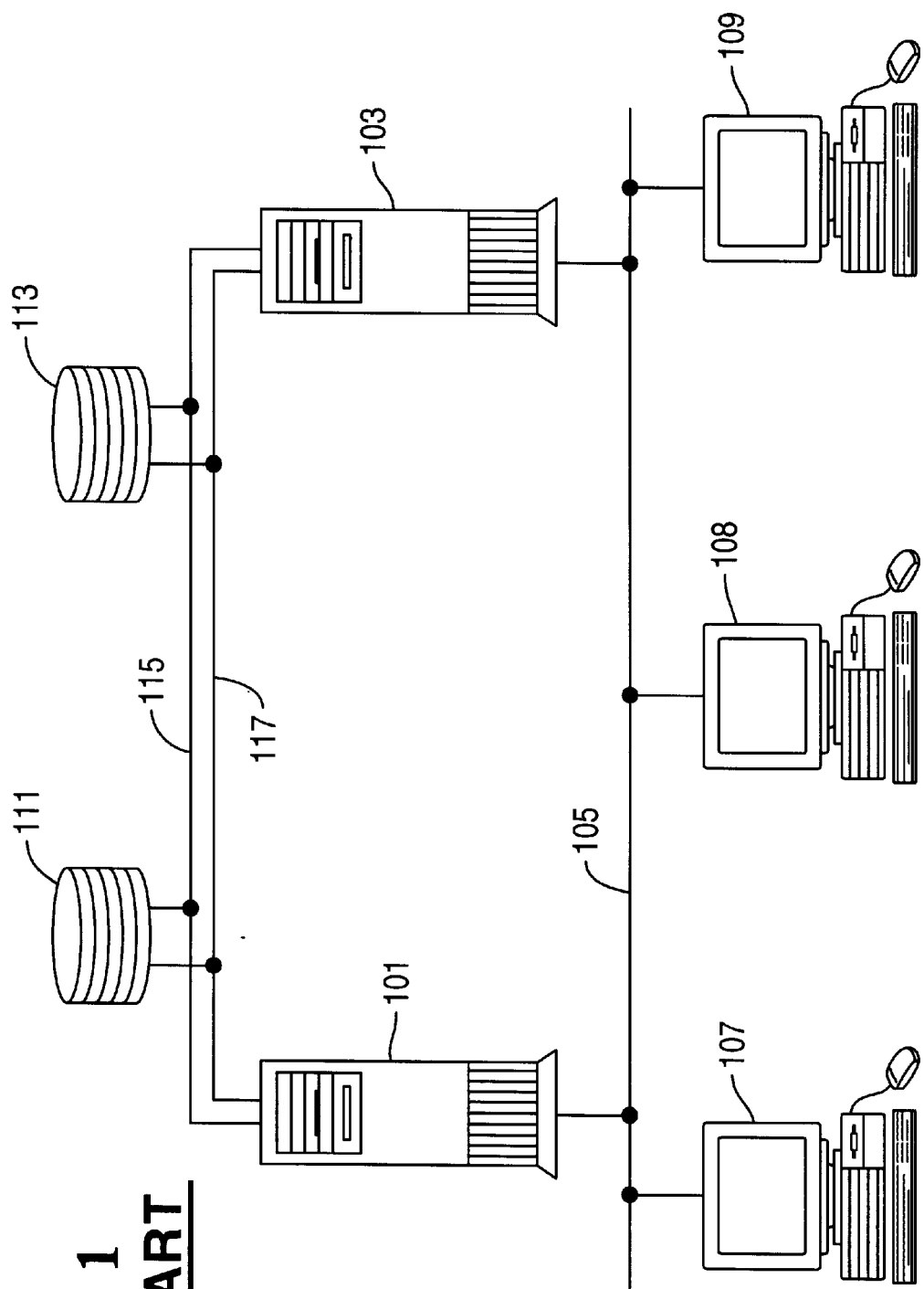
FIG. 1 is a diagram of a clustered computer system including primary and secondary servers and a pair of shared disk storage devices.
Figure 2:
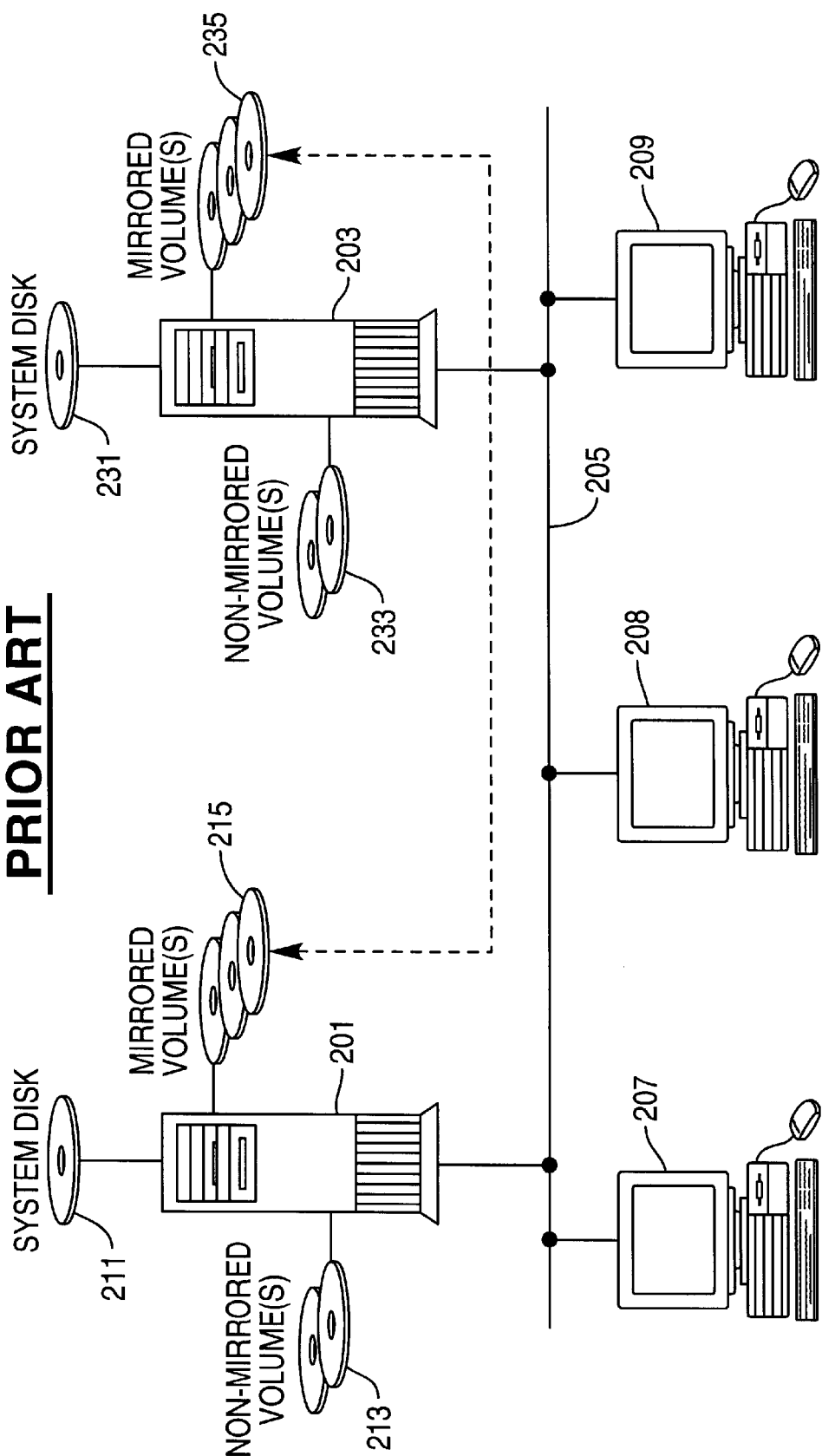
FIG. 2 is a diagram of a clustered computer system including primary and secondary servers, primary and secondary non-shared disk storage devices, and a disk volume mirroring mechanism in accordance with the present invention.

FIG. 2 provides an illustration of a clustered computer system including a primary server 201 and a secondary server 203. Primary server 201 includes three types of disk storage volumes: system volume 211, non-mirrored volumes 213, and mirrored volumes 215. Similarly, secondary server 203 includes system 231, non-mirrored 233, and mirrored 235 disk volumes. These disk volumes may be physical disk drives or disk drive partitions. The primary and secondary servers are coupled through a network bus system 205 to a plurality of client computers 207 though 209.

The system shown is provided with software-based mirroring between the two servers and their mirrored volumes over a Local Area Network (LAN). Client computers can read or write only to mirrored volumes 215 on primary server 201. The corresponding mirrored volumes 235 on secondary server 203 are locked preventing access to data unless a failed state is detected on the primary server, a critical consideration when implementing a High Availability solution since data integrity is a major factor.

After the volume mirrors are established, the drives on the primary and secondary servers are synchronized, and both servers are up and running, volume mirroring conventionally proceeds as follows:

1. After the initial mirror is established, the system locks out all user access to the secondary mirrored volumes 235. Reads and writes are not allowed to the mirrored volumes 235 on the secondary. The primary server mirrored volumes 215 are accessible for both reads and writes.
2. Both mirrored and non-mirrored volume read operations arriving at the primary server 201 are passed on and allowed to complete normally without intervention. Reads of the mirrored volumes 235 on the secondary server 203 in a standby mode are not allowed, i.e. the secondary server has not assumed the role of a failed primary server.
3. Whenever the primary server 201 receives a write request, the system first determines whether the request is for mirrored volumes 215. If not, the write is allowed to complete normally without any further intervention. If, however, the primary server write request is for mirrored volumes 215, the request is sent to the secondary mirrored volumes 235 first. The secondary system executes the write request on its mirrored volumes and then sends the status of the write back to the primary server. The primary server does nothing on the write request until the secondary server returns its status.
4. When the secondary server returns a successful status, the primary server executes the write to its mirrored volumes 215 and returns to the caller. Should an error occur while the secondary server executes its mirrored volume write, the write process on the secondary server is terminated. The primary server then completes the write request on its mirrored volumes and the status of the mirror then changes from Normal to Broken.
5. The secondary mirrored volumes 235 are locked to all users once the mirror is created. Locking the secondary mirrored volumes ensures that data on both the primary and secondary mirrored volumes is not corrupted through an inadvertent write to the secondary mirrored volumes. When a mirror is deleted, the secondary mirrored volumes are unlocked and full access is again allowed to both the primary and secondary volumes.

As described above, the conventional, synchronous, method for performing disk mirroring with non-shared drives over a network, is for the primary drive to complete its write operation after receiving confirmation of a successful write to the secondary drive. A system permitting writes to occur asynchronously would provide for performance and other improvements.

Asynchronous Writes

For the purposes of this discussion, "asynchronous" writes are defined as writes which do not block the writer. Furthermore, asynchronous writes should be deterministic within some user-defined time granularity; e.g., all writes are guaranteed to be passed to the network transport within some reasonable time period. Beyond such a reasonable time period the writes are no longer asynchronous, but rather "check-pointed". Check-pointed writes will be discussed in greater detail below.

Figure 3:
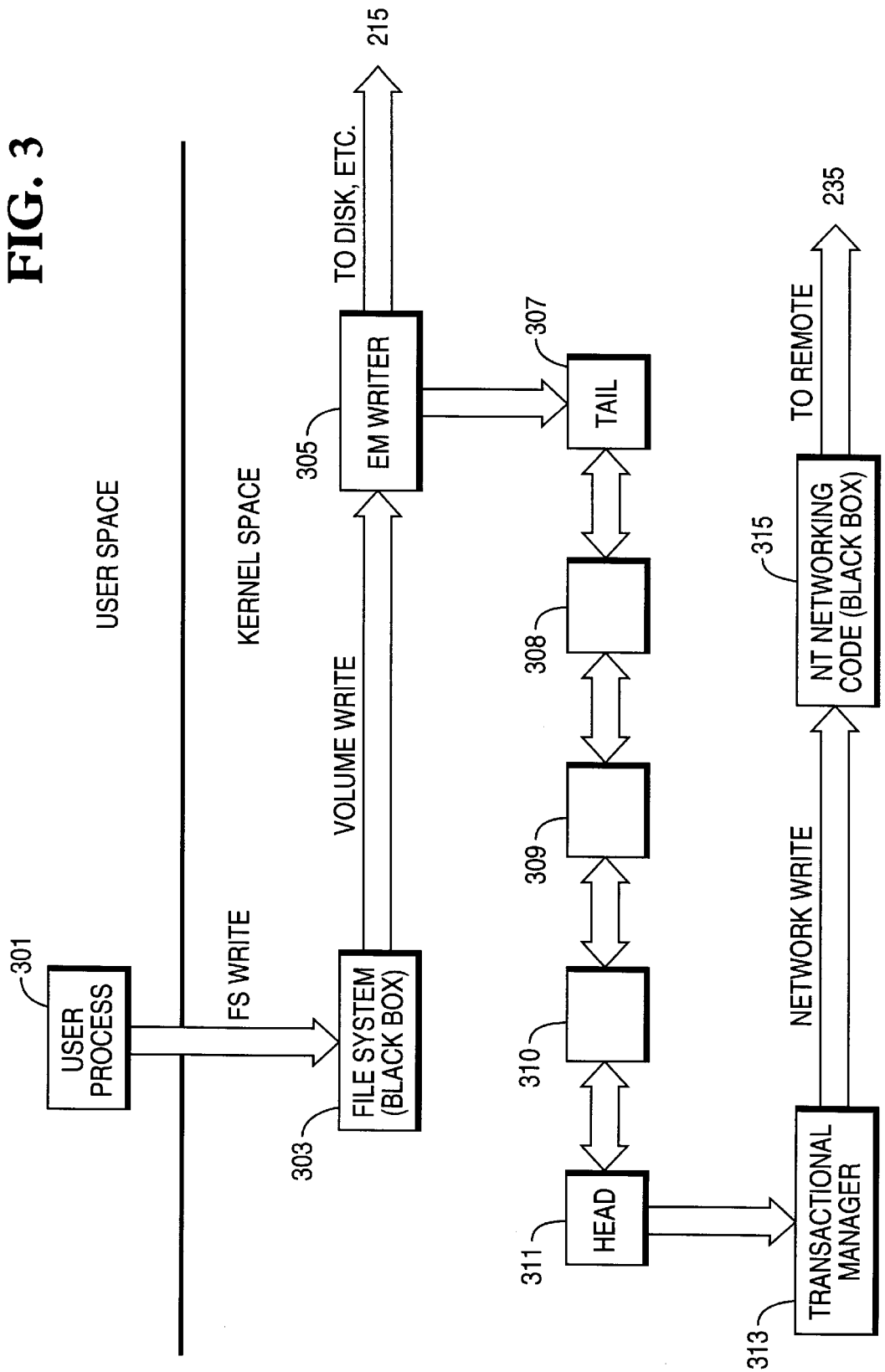
FIG. 3 is a diagram of a queuing system for performing asynchronous writes in a disk mirroring application in accordance with the present invention.

A system for effecting asynchronous writes can be constructed fairly simply with the implementation of an asynchronous write queue. A basic implementation of this system is shown in FIG. 3. The system employs a writer thread which does nothing more than enqueue write requests, and a transaction manager thread which maintains any state associated with the queue and synchronization with the like threads executing on the target. The queue is simply a linked list of write requests, ordered in a first-in, first-out (FIFO) sequence, bound for the secondary mirrored volume.

In operation, write transactions received by the file system 303 from a user process or application 301 are directed through write manager 305 to both the primary mirrored volume 215 and into the write queue, represented by queue elements 307 through 311. Write transactions received from the write queue by transaction manager 313 are directed over the network to the secondary mirrored volume 235.

Figure 4:
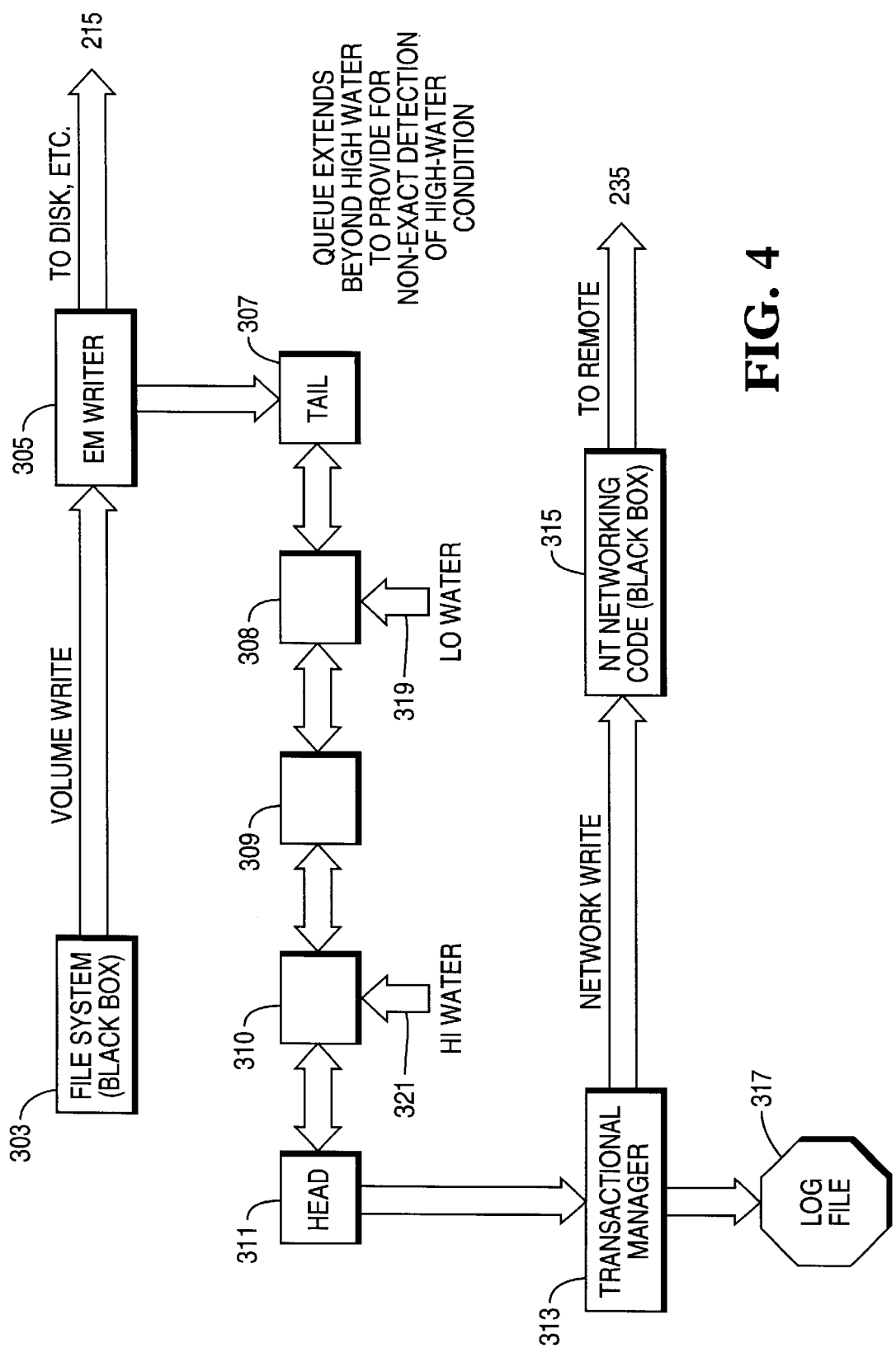
FIG. 4 is a diagram of the queuing system of FIG. 3 further including a mechanism for managing queue size and maintaining a log file in accordance with the present invention.

FIG. 4 provides a diagram of the queuing system of FIG. 3 further including a high water mark 321 and a low water mark 319 mechanism for managing queue size, and a log file 317.

The high and low water marks are monitored, and the queue flushed upon the occurrence of the following events:
1. In order to guarantee some degree of deterministic latency, transactions are written to the secondary drive, or target, based on a timer with a timeout associated with each block.
2. Since memory is a finite resource, the queue should be kept to a manageable size. Writes are queued based upon resource exhaustion. This is implemented with a high water mark 321 and a corresponding low water mark 319. The algorithm is simple: when the queue length hits the high water mark, further transactions are blocked until writes to the target have completed. The low water mark is the point at which writes are again placed into the queue.

If the network becomes unavailable, but the mirror is known to be unbroken, then the queued write transactions are written to a non-mirrored log file 317.

The algorithm for dequeueing a write request and sending it to the target machine is illustrated by the following pseudo code:

```
TmDequeue()
{
  if (queue_head > high-water)
  {
    pause writer.
    while (queue_head ! = low-water -AND- queue_head ! = queue_tail
    {
      if (network is available)
        send (queue_head)
      else
        logfile (queue_head)
      queue_head = queu_head->previous
    }
  }
  while (unsent transactions in the log -AND- network is available)
  {
    read next log transaction;
    send (log transaction)
  }
  while (queue_head->timeout >- current-time -AND- queue_head !=
  queue_tail)
  {
    if (network is available)
      send (queue_head)
    else
      logfile (queue_head)
    queue_head = queu_head -> previous;
  }
}
```

In order to optimize the queuing process for write locality, i.e., minimizing duplicate writes, each queued write transaction contained on a linked list for FIFO writes is also associated with a hash chain based upon the block being written. The queuing algorithm on the writer simply enqueues each new transaction normally into the transmit queue, then walks the hash chain for the given block to see if the new transaction supersedes a transaction that's already queued. If it does, then that item is replaced, otherwise the new transaction is inserted onto the end of the hash chain. The same algorithm can be extended to work on log files, as illustrated in the following pseudo code:

```
WriterEnqu( )
{
  insert transaction into tail of queue;
  if (duplicate block optimizations disabled)
         return;
  hash_index - hash_function (transaction->block#)
  while (hash_chain[hash_index]->next!- NULL)
  {
    If (hash_chain[hash_index]->block# = =
      this_transaction->block#)
      dequeue (hash_chain[hash_index])
  }
  insert this transaction into end of hash_chain[hash_index]
}
```

It's important to note that the hash table should not be an actual copy of the data, but a link to the write queue. Or, rather, the structure describing the queued transaction should provide hash pointers as well as queue list pointers.

The figures and description presented above provide a high-level view of an asynchronous (or delayed write) scheme for extended mirroring. The system is triggered on a clock, and the resources are regulated with low and high-water marks. The system is tolerant of network delays with the use of a log file, and optimized to minimize duplicate block writes with a block hash queue.

The system can also be easily modified to perform synchronous operation by reducing the queue size to one element, setting the timeout to zero, and disabling the duplicate block optimizations.

Check-pointed Writes

Check-pointed writes, for this discussion, will be defined as the queuing of mirrored writes for transmission at a predetermined point in time. A method whereby queued writes are written to a log file if the network is unavailable and the mirror is not broken has been described above. Check pointing of transactions can be accomplished by simply forcing the writing of the log file instead of attempting a network send.

A modified dequeue algorithm for performing checkpointing is illustrated in by the following pseudo code:

```
TmDequeueo
{
    if (queue-head > high-water)
    {
        pause writer.
        while (queue_head != low_water -AND- queue_head != queuel-tail)
        {
            if (network is available -AND- we're not in batch mode)
                send (queue_head)
            else
                logfile(queue-head)
            queue_head = queu_head->previous
        }
    }
    while (queue_head->timeout >= current_time -AND-
    queue_head != queue-tail)
    {
        if (network is available -AND- we're not in batch mode)
            send (queue_head)
        else
            logfile (queue_head)
        queue-head - queu_head->previous;
    }
}
```

At the appropriate update time, the log file is replayed through the network, in accordance with the log reconstructed resynchronization process described in the following section.

Log Reconstructed Resynchronization

Resynchronizing mirrored volumes through the use of logs provides the user with the ability to perform checkpointed writes, and minimizes resynchronization times over byte-by-byte reconstruction. Byte-by-Byte reconstruction still has its place in cases where the log file either doesn't exist or is hopelessly out of sync with the target's log file.

In order to perform log-reconstructed resynchronizations, pseudo code similar to that illustrated below must be executed on the target machine:

```
ProcessWrite( )
{
    send acknowledgment to source;
    write transaction to file system;
    write transaction to log file;
}
```

On reconstruction, the following process is executed:

```
NegotiateResync( )
{
    A = last transaction sequence number from source;
    B = last transaction sequence number from target;
    Last_confirmed_write = min (A, B)
    if (last_confirmed_write from source)
        ReplayFromSource( );
    else
        ReplayFromTarget( );
}
```

The actual resynchronization operation would "play" each transaction from the log through the enqueue functionality in the code. This also would require that the enqueue functionality be included in both the source and target code.

To keep the log file sizes manageable, the source and target must periodically agree on the last known write and synchronize their log files to that write, deleting what came before.

When synchronizing the log files, a history should be maintained which goes back N sync points to provide reliability should the log file itself not be written from the file system cache on a system failure.

It can thus be seen that there has been provided by the present invention a mechanism for performing asynchronous updates to mirrored drives through the implementation of an asynchronous write queue. The mechanism further provides the ability to perform log-based reconstruction of a mirror drive, and check pointing of source and target volumes within a disk mirroring application.

Although the presently preferred embodiment of the invention has been described, it will be understood that various changes may be made within the scope of the appended claims.

What is claimed is:

1. A computer system comprising:
   a first storage volume connected to receive write requests from said computer system;
   a write queue connected to receive said write requests directed to said first storage volume;
   a second storage volume connected to said write queue to receive said write requests, said write queue operating to delay the time of receipt of said write requests by said second storage volume;
   a mechanism for determining whether said write queue is full beyond a "high water" mark and blocking the processing of further write requests to said first storage volume and said write queue, and
   a mechanism for determining whether said write queue is cleared below a "low water" mark following said blocking of the processing of further write requests to said first storage volume and said write queue, and resuming the processing of further write requests to said first storage volume and said write queue.

2. The computer system in accordance with claim 1, wherein:
   said write queue comprises a plurality of serially connected write buffers, wherein said write requests pass through said write queue in a first-in, first-out (FIFO) sequence.

3. The computer system in accordance with claim 1, further comprising:
   a log file connected to said write queue to receive said write requests.

4. A computer system comprising:
   a first server computer including a first storage volume connected to receive write requests from said computer system;
   a second server computer including a second storage volume;
   a communications network connecting said first and second server computers;
   a write queue connected to receive said write requests directed to said first storage volume, and connected to provide said write requests to said second storage volume through said communications network, said write queue operating to delay the time of receipt of said write requests by said second storage volume;

a mechanism for determining whether said write queue is full beyond a "high water" mark and blocking the processing of further write requests to said first storage volume and said write queue; and a mechanism for determining whether said write queue is cleared below a "low water" mark following said blocking of the processing of further write requests to said first storage volume and said write queue, and resuming the processing of further write requests to said first storage volume and said write queue.

5. In a networked computer system including a first network node including a first storage volume, a second network node including a second storage volume, and a communications link connecting said first and second network nodes, apparatus for asynchronously mirroring write requests directed to said first storage volume to said second storage volume, said apparatus comprising:

a write queue connected to receive said write requests directed to said first storage volume, and connected to provide said write requests to said second storage volume through said communications link, said write queue operating to delay the time of receipt of said write requests by said second storage volume;

a mechanism for determining whether said write queue is full beyond a "high water" mark and blocking the processing of further write requests to said first storage volume and said write queue; and a mechanism for determining whether said write queue is cleared below a "low water" mark following said blocking of the processing of further write requests to said first storage volume and said write queue, and resuming the processing of further write requests to said first storage volume and said write queue.

6. In a computer system including first storage volume, a method for mirroring write transactions directed to said first storage volume, said method comprising the steps of:

providing a second storage volume;

copying said write transactions directed to said first storage volume and providing said copied write transactions through a first-in first-out (FIFO) write queue to said second storage volume, said write queue operating to delay the time of receipt of said copied write requests by said second storage volume;

determining whether said write queue is full beyond a "high water" mark and blocking the processing of further write requests to said first storage volume and said write queue; and determining whether said write queue is cleared below a "low water" mark following said blocking of the processing of further write requests to said first storage volume and said write queue, and resuming the processing of further write requests to said first storage volume and said write queue.

7. The method in accordance with claim 6, further comprising the step of:

copying storage device state information associated with said first storage volume and providing said copied storage device state information through said first-in first-out (FIFO) write queue to said second storage volume, said write queue operating to delay the time of receipt of said copied storage device state information by said second storage volume.

* * * * *